Jan. 2, 1934.  G. SCHIEMER  1,942,259
COMBINATION LOCK BOLT
Filed March 4, 1932

Inventor
George Schiemer

By Miller + Miller
Attorneys

Patented Jan. 2, 1934

1,942,259

UNITED STATES PATENT OFFICE 1,942,259

COMBINATION LOCK BOLT

George Schiemer, Parma, Idaho

Application March 4, 1932. Serial No. 596,834

1 Claim. (Cl. 151—2)

This invention relates to a combination lock bolt and has for an object to provide an improved combination lock bolt and nut wherein the bolt and nut will each have cooperating elements whereby the nut may be easily locked against accidental removal, yet easily unlocked for intentional removal.

A further object of this invention is to provide an improved combination lock bolt and nut wherein the nut may be locked against accidental removal at every sixth of a revolution for large size nuts and at every third of a revolution or sixth of a revolution for smaller size nuts.

Yet a further object of this invention is to provide an improved combination lock bolt and nut wherein the bolt will have a longitudinal groove crossing the threads and the nut will have a plurality of keys, any one of which may be pressed into the groove to prevent accidental removal.

A further object of this invention is to provide an improved combination lock bolt and nut wherein the nut is provided with a plurality, preferably three or six, of soft tempered keys integral therewith, any one of which may be hammered into a longitudinal groove on a cooperating bolt to prevent the nut from accidentally being removed.

Still another object of this invention is to provide a plurality of locking keys on the nut of a lock bolt and nut, wherein the locking keys will be set back so as not to have any thread cut therein and wherein the locking keys may be hammered into and easily bent out of the locking groove on the bolt.

Still a further object of this invention is to provide a plurality of keys or prongs which are tapered at the end to allow a wedge or sharp pointed punch to slide thereunder for unlocking the same.

With the foregoing and other objects in view, as will hereinafter become apparent, this invention comprises the constructions, combinations and arrangements of parts, hereinafter set forth, disclosed and shown on the accompanying drawing. In this drawing, Figure 1 is a side elevation of the bolt and nut showing one of the keys or prongs of the nut on line with groove in bolt.

Figure 1:
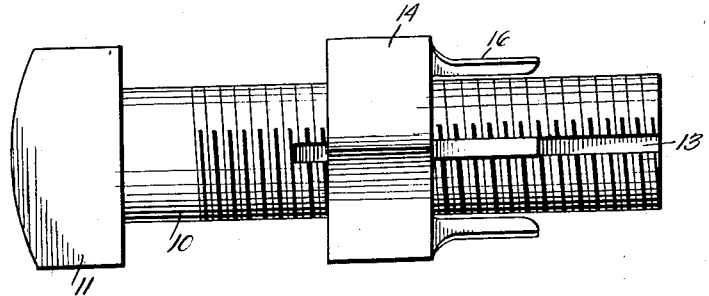
Figure 2:
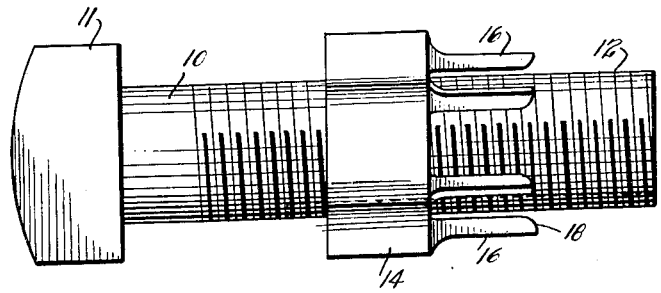
Figure 2 is a top plan view of Figure 1.
Figure 4:
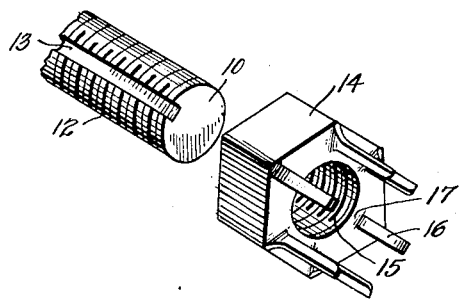
Figure 4 is a perspective view showing more clearly the arrangement of the keys or prongs on the nut, part of the bolt being shown.
Figure 3:
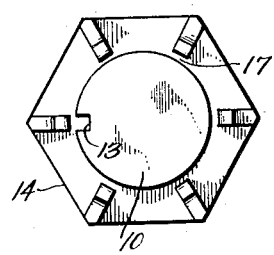
Figure 3 is an end view looking from the right end of Figure 1.

There is shown at 10 a bolt having the usual head 11 and thread 12 therein, the bolt 10 being any type of conventional machine or carriage bolt except for the improvements hereinafter described.

A groove 13 is cut longitudinally along one side of the bolt 10 crossing substantially most, but not necessarily all, of the threads 12. A nut 14 threaded as at 15 to cooperate with the threads 12 has a plurality of keys or prongs 16 thereon. As will be observed, the nut 14 is hexagonal in shape, but it will be understood that the nut may be formed in any other desired shape as square or otherwise. The prongs 16 are integrally formed with and projecting from the top of the nut 14, the prongs 16 being preferably soft tempered so that they may easily bend. The prongs 16 are set back as at 17 from the thread 15 of the nut so that no thread will be cut in the prong 16. The ends of the prong 16 are tapered outwardly as shown at 18.

In the hexagonal shaped nut preferably six prongs 16 will be provided on the nut 14, but when the nut is of a fairly small size only three prongs need be provided, one at each alternate corner. If the nut be square shaped then two or four prongs may be provided. It will be understood moreover that any desirable number of prongs, one or more, may be provided on any size or shape of nut. The prongs 16 will preferably be a length equal to the thickness of the nut 14.

In operation, the bolt 10 having been inserted in its proper position, the nut 14 will be threaded thereon as far as it can go to hold the bolt securely in position. It will then be placed in position so that the nearest prong 16 will be over the groove 13 by backing the nut off a fraction of a revolution if necessary, the groove 13 being in depth slightly greater than the depth of the threads 12. When in this position the prongs 16 may be tapped down into the groove 13 either by use of a hammer, wrench or other convenient object. When thus bent into the groove 13, it will be obvious that it will be impossible for the nut 14 to accidentally be removed from the bolt 14 through any means.

When it is desired to intentionally remove the nut 14, a sharp pointed instrument such as a punch or thin wedge will be placed into the groove 13 and pushed along until it enters under the tapered end 18 of the key or prong 16, which had been bent into the groove. By then forcibly inserting the sharp pointed instrument further into the groove 13 under the tapered end 18 of the prong 16, the prong will be bent out of the groove clear of the threads, allowing the nut to be backed clear of the bolt.

The novel features and the operation of this device will be apparent from the foregoing description. While the device has been shown and the structure described in detail, it is obvious that this is not to be considered limited to the exact form disclosed and that changes may be made therein within the scope of what is claimed without departing from the spirit of the invention.

Having thus set forth and disclosed the nature of this invention, what is claimed is:

A nut lock comprising a threaded bolt having a longitudinal furrow formed therein transversely of the threads, said furrow being of slightly greater depth than the depth of the threads, of a nut having one or more soft tempered bendable keys projecting longitudinally from one side thereof a distance substantially equal to the thickness of the nut, with the inner edge of said key displaced from registration with the bore of the nut a distance slightly greater than the depth of the threads, the end of said inner edge tapering abruptly outward to meet the outer edge, the outer edge extending parallel to the inner edge for the greater part of its length, and then inclining abruptly to a corner of the nut, the distance between the parallel inner and outer edges of said key being less than half the distance between the bore and the outside of the nut.

GEORGE SCHIEMER.